Figure 1:
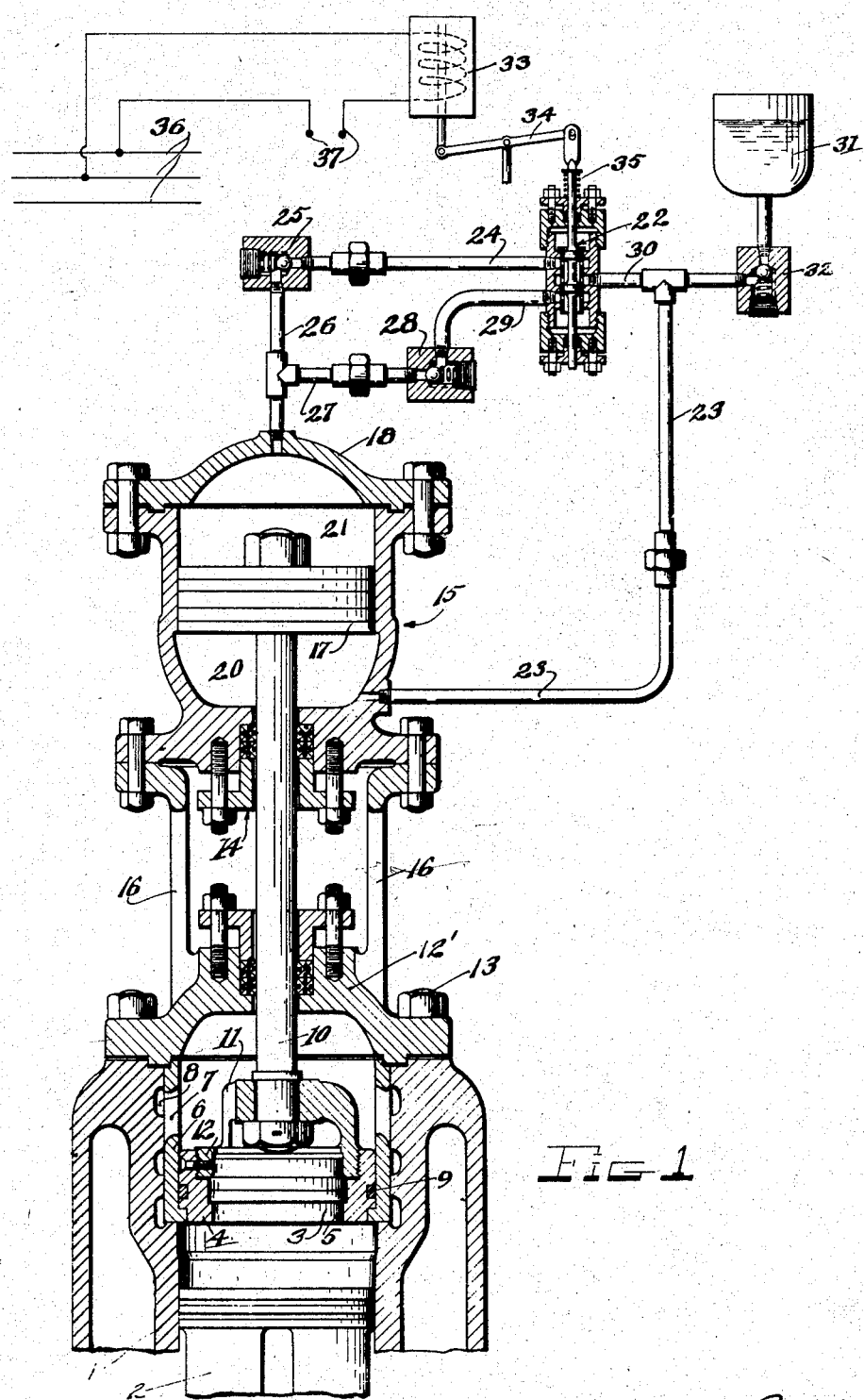

Dec. 25, 1934.  L. F. MOODY  1,985,642

ADJUSTABLE CLEARANCE APPARATUS FOR COMPRESSORS

Filed Dec. 5, 1931  2 Sheets-Sheet 2

Responsive device e.g. thermostat or pressure diaphram

INVENTOR
Lewis F. Moody
BY
Edward ......... ATTORNEY

Patented Dec. 25, 1934

1,985,642

UNITED STATES PATENT OFFICE 1,985,642

ADJUSTABLE CLEARANCE APPARATUS FOR COMPRESSORS

Lewis Ferry Moody, Princeton, N. J.

Application December 5, 1931, Serial No. 579,325

17 Claims. (Cl. 230—21)

This invention relates generally to compressors of the reciprocating piston type having an adjustable clearance space such as is especially desirable in refrigerating compressors, and more particularly to improved means for effecting adjustment of the variable clearance mechanism.

In refrigeration installations it is desirable to be able to vary in a continuous and gradual manner the refrigerating capacity of the compressor while allowing the compressor to operate at a constant speed, this constant speed being usually effected by the use of a synchronous motor having generally only one speed, or through the use of pole changing apparatus the motor may have two or three different speeds, but in any event each of these speeds will have its own constant value. Hence in order to obtain a completely flexible adjustment, it is desirable to employ an adjustable clearance mechanism.

It is further desirable to adjust the clearance space while the compressor is in operation and to rigidly hold the clearance mechanism in positive position until another adjustment is required. Heretofore the clearance mechanism has been adjusted through mechanical elements such as a screw and nut, operated, for instance, by a hand wheel, and after the adjustment is effected a lock nut is employed to hold the adjustment and take up any slack in the mechanism. However, mechanical arrangements of this or other types are not fully suited for the degree of flexible operation which is desired, especially when automatic control apparatus is employed to adjust the clearance space automatically in accordance with some predetermined condition, such as is usually found desirable particularly in refrigeration work. If it is attempted to eliminate the lock nut so that the clearance mechanism is immediately available for adjustment, it is found that the alternate compression and suction strokes of the piston will cause the clearance mechanism to chatter or vibrate due to the slack or play between the nut and screw, such as will normally occur in the course of use, and is always necessary in some degree to permit easy operation.

It is one object of my invention to provide an arrangement whereby the desired degree of flexible operation may be obtained without the disadvantages such as above described or which may otherwise be present in the above or other types of mechanical controls. In a more specific aspect of the invention it is a further object to provide an improved arrangement whereby the actuating power for the clearance mechanism is self-contained with the compressor, thereby avoiding the necessity of electric motors or other prime movers for actuating the variable clearance mechanism. Another object in this respect is to provide an improved arrangement whereby the utilization of this power may be controlled in a simple and effective manner and yet permit the variable clearance mechanism to be positively held after adjustment is effected.

More specifically it is an object of my invention to effect fluid pressure actuation of the clearance mechanism and further to hold the same in position and to control its movement by fluid pressure means. In one specific aspect of the invention this is accomplished by a hydraulic cylinder and piston connected to the movable element of the variable clearance mechanism. By suitable one-way bypasses connected between the opposite ends of the hydraulic cylinder, means are provided whereby when one of the bypasses is open the piston may move in one direction only. Adjustment of the clearance mechanism is effected by opening one or other of the bypasses, whereby the successive strokes of the compressor piston, say the compression strokes, will cause the compressed gases to exert a force on the movable clearance element, and due to one of the bypasses being open, fluid from one end of the hydraulic cylinder will be forced out to the other side of its piston. The result is that the hydraulic piston and movable clearance element will be gradually moved outwardly to enlarge the clearance space. When the desired adjustment is obtained, the by-pass is closed, thus positively holding the clearance mechanism in position, and due to absence of air in the hydraulic system any tendency to chatter is eliminated. On the other hand, when it is desired to decrease the clearance space, the other by-pass is opened, whereupon the successive suction strokes of the compressor piston will cause an inward pull on the movable clearance element and thus cause the hydraulic cylinder liquid to flow from one end of the cylinder to the other.

A further object of the invention is to have the various elements arranged in such cooperating relation that the by-passes may be controlled automatically in accordance with the predetermined operating conditions, such as temperature, pressure or other conditions found particularly in refrigeration work. Another object is to provide improved restoring mechanism in connection with the valve mechanism for controlling the cylinder fluid, thereby avoiding "hunting" particularly if rapid adjustment is needed, and maintaining the piston and clearance element in definite position or restoring it to that position if it should drift due to leakage around the piston.

While the arrangement as specifically described herein derives its adjusting power from the pressure fluctuations in the compressor cylinder, which pressure fluctuations cause a pumping of the fluid from one end of the hydraulic cylinder to the other, it will of course be understood that an external pressure supply may be added to the hydraulic cylinder so as to either supplement or supplant the automatic self-contained power system. This external supply may be provided with either manual or automatic control although in either case various control elements may be added as occasion requires. It may be frequently desirable to add a mechanical hand operated mechanism, such as screw and lock nut, in case it is desired to change from hydraulic to hand operation, or to lock the clearance element in fixed position, this being accomplished, for instance, by providing a sufficient extent of screw threads on the piston rod between the compressor and hydraulic cylinder so as not to interfere with the piston rod packing but yet permit a nut or nuts to engage the cylinder heads for moving or holding the rod.

Figure 2:
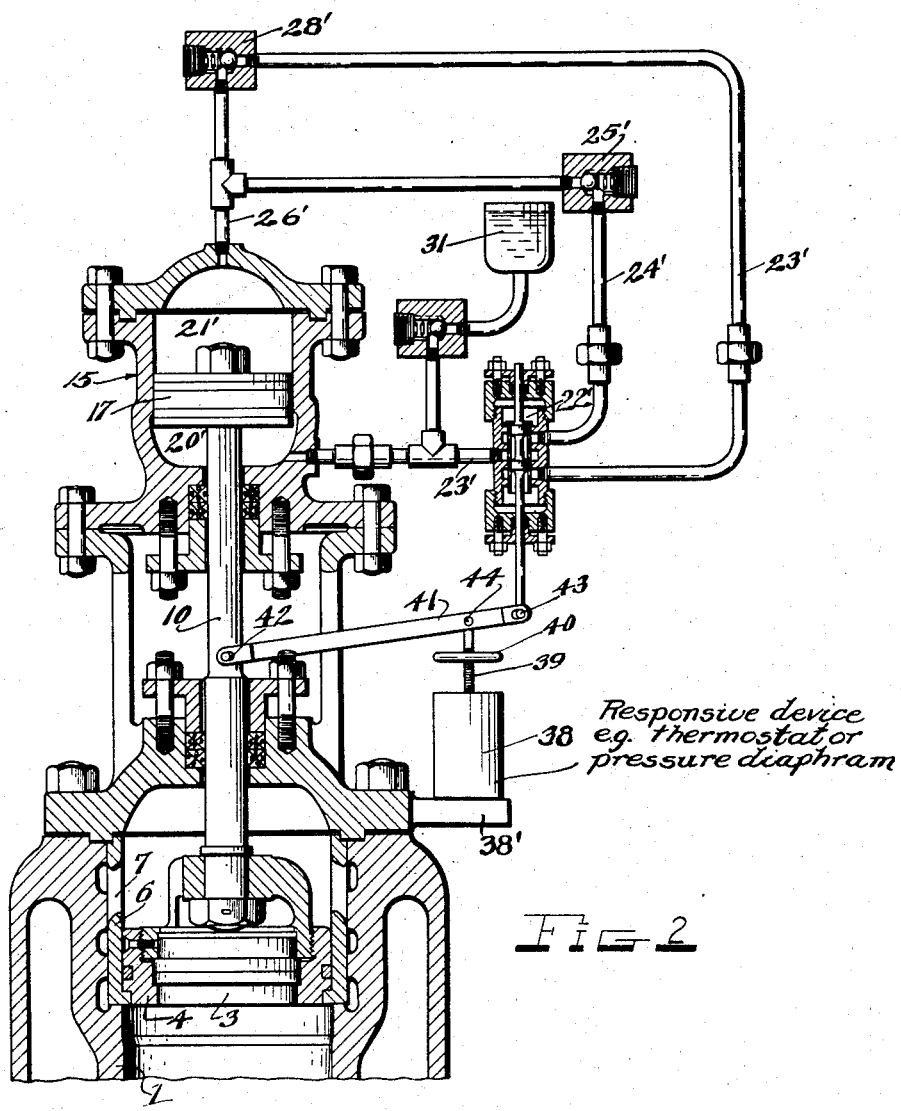

Other objects and advantages will be more apparent to those skilled in the art from the description of the accompanying drawings, in which:

Fig. 1 is a sectional view of the adjustable clearance mechanism and the actuating and controlling means therefor, only a part of the compressor cylinder being shown; and Fig. 2 is a modification of Fig. 1 embodying a restoring mechanism.

While the adjustable clearance mechanism specifically shown is of the general type, wherein the valve mechanism is bodily adjustable in order to vary the clearance space, it will of course be understood that my improved invention may be applied to any of the various plunger types of variable clearance devices wherein the plunger may be actuated or controlled in the same manner as the valve type mechanism herein disclosed. My invention is also specifically shown as applied to a vertical type of compressor but as will be understood from the disclosure herein, the invention is equally applicable to horizontal or other types of compressors.

In the illustrated embodiment of the invention, there is shown a compressor cylinder 1 in which is a usual reciprocating piston 2. A discharge valve mechanism generally shown in elevation at 3 is removably held in an annular valve container 4 which is provided with a flange 5 for supporting the valve mechanism. The valve and container together form a cylinder head which is movably supported in a sleeve 6. It will be seen that this cylinder head constitutes an adjustable wall which forms a boundary for the clearance volume of the cylinder. This sleeve is ported at 7 to allow communication with discharge ports 8. A suitable packing ring 9 may be interposed between the relatively movable surfaces of the valve container and sleeve 6 while the movable cylinder head is supported on an operating rod 10 through a series of arms 11 which, preferably, are formed integrally with an annulus 12 threaded in container 4. The rod 10 extends upwardly through a suitable packing gland disposed in a fixed outer cylinder head 12' which is removably secured to the cylinder by bolts 13, thereby also holding sleeve 6 in position. The arrangement so far described is that of the type of variable clearance mechanism in which the rod 10 is normally actuated by a nut having threaded engagement with the rod 10.

In my improved construction the rod 10 extends through an upper packing gland 14 formed in a hydraulic cylinder 15 which is removably carried by the compressor cylinder head 12' as through upstanding legs 16. A piston 17 is carried on the upper end of rod 10 while the hydraulic cylinder is provided with a removable head 18.

The control mechanism for the hydraulic piston and cylinder 15 comprises means for allowing communication between the lower chamber 20 and upper chamber 21 with suitable valve mechanism for determining whether the flow shall be from chamber 20 to 21 or vice versa. It will be first understood that the hydraulic cylinder and the associated passages to be described are maintained completely filled with liquid. Assuming that it is desired to reduce the clearance space between piston 2 and the cylinder head 3, 4, a pilot valve generally indicated at 22 will be moved to its up position shown in Fig. 1. Upon successive suction strokes of piston 2, there is a resultant downward pressure on the movable cylinder head, thereby causing fluid in chamber 20 to be forced or pumped out through a pipe 23, pilot valve 22 to a pipe 24, thence through a check valve 25 and a pipe 26 to the upper chamber 21, thus permitting downward movement of the movable cylinder head to reduce the clearance. When the desired result has been obtained, pilot valve 22 is moved to its neutral position, thus covering the ports leading to pipe 24. To increase the clearance space as by upward movement of the cylinder head, pilot valve 22 is moved downwardly whereupon successive compression strokes of piston 2 will cause a differential upward thrust on the movable cylinder head causing piston 17 to force or pump fluid from chamber 21 outwardly through a pipe 27, past a check valve 28, through a pipe 29 to ports in valve 22 leading to a pipe 30 and thence downwardly through pipe 23 to the lower chamber 20. When the desired adjustment has been obtained, pilot valve 22 is moved to its neutral position thereby closing the ports leading to pipe 29, it being noted that the ports leading to pipe 24 are also closed at this time, thus preventing any movement of hydraulic piston 17 and accordingly holding the clearance mechanism in position. It will be further noted that the check valves 25 and 28 are so arranged that fluid can flow past only one of them at a time depending upon the direction of adjustment of pilot valve 22.

To maintain the hydraulic system completely filled, there is provided a make-up supply 31 communicating with pipes 23 and 30 through a check valve 32, which is arranged to permit only inflow of liquid to the system.

The pilot valve may be actuated in any suitable manner depending upon the desired object of control. If the control is susceptible to the incorporation of an electrical circuit, then the pilot valve may be controlled by a solenoid such as 33 whose core may be directly connected to the pilot valve stem or through a pivoted lever 34. A spring 35 may be employed to normally urge the pilot valve to its up position thereby necessitating some degree of energization of solenoid 33 in order to move the pilot valve to neutral or to be held in down position. To effect energization of the solenoid, it may be connected to any suitable supply line such as 36 while suitable apparatus which is responsive to a particular condition, which it is desired to control, may be directly connected to terminals 37. For example, this control apparatus may be a thermostat or pressure diaphragm as later described. The thermostat or diaphragm may in some cases be directly connected to valve 22, as described in the Fig. 2 modification.

In the modification shown in Fig. 2, the adjustable clearance mechanism and hydraulic apparatus are the same as shown in Fig. 1 except that the pilot valve 22' instead of being controlled by a solenoid is here controlled directly by the condition responsive apparatus such as a thermostat, pressure diaphragm, or other control generally indicated at 38 which is rigidly carried by a fixed support 38. This apparatus may be of any usual standard design but is equipped with an extensible stem 39 which may be adjusted as by a screw and hand wheel operated nut generally indicated at 40 for the purpose of adjusting the length of stem 39 thereby to change the normal or neutral setting of the linkages 40 and valve 22'. The stem 39 is pivotally connected to a restoring lever 41, one end thereof being pivotally connected as at 42 to the hydraulic piston rod 10 while the other end is pivotally connected to the pilot valve stem as at 43.

The operation of this modification is as follows. When apparatus 38 responds to its particular controlling condition so as to move lever 41, say upwardly to the position shown, pilot valve 22' will allow fluid flow from upper chamber 21' through pipe 26', past check valve 25', thence through pipes 24', pilot valve 22' and pipe 23' to the lower chamber 20', thereby permitting adjustment of the clearance space on successive compression strokes of the compressor piston so as to enlarge the clearance space. As the clearance space enlarges, which is accompanied by upward movement of rod 10, pivot 42 will cause floating lever 41 to swing in clockwise direction around pivot 44, thereby causing pivot 43 to gradually move pilot valve 22' toward its neutral position. This restoring action will insure stability of adjustment during relatively quick adjustment and the movements are so coordinated that the necessary adjustment of the clearance is effected for a given variation of the controlling condition. To reduce the clearance space, the operation will be the reverse to that just described except that pipe 23' and check valve 28' will function. It will of course be appreciated that manual control may be imposed upon the automatic control through operation of the wheel 40. The action of the restoring mechanism is to make the movement of the clearance element proportional to the change in temperature, pressure, etc. which is to be controlled. Without it, the hydraulic piston might move to the end of its travel for a small change in the temperature or pressure, etc. before the controlling condition would have time to respond. This hunting action could in some cases be avoided by throttling the bypass passages, as by needle valves, to make the piston movement sufficiently slow. In such a case the restoring mechanism could be omitted. However, the restoring mechanism is desirable for quick operation.

From the foregoing description it is seen that arrangements are provided whereby the adjustable clearance mechanism may be actuated without the disadvantages incident to mechanical devices, wherein any slight backlash which is needed for easy movement will result in serious chatter and pounding. In addition the arrangement may be very simply automatically controlled through the pilot valve or other equivalent means while the source of self-contained power avoids the necessity of an external source unless such should be desired as previously mentioned.

In the drawings the hydraulic piston and cylinder are proportioned for relatively low pressure in the operating fluid, of the same order as the ammonia pressure. However in general it will be preferable to use higher pressure control, in which case the hydraulic operating piston can be made considerably smaller in diameter than the main compressor valve head or power piston, thus reducing the sizes of the control cylinder and the amount of fluid to be handled. The drawings clearly illustrate the principles involved, which will apply to either high pressure or low pressure control. Fig. 2 is proportioned for a higher control pressure than Fig. 1 and thus illustrates the feature here mentioned.

It will of course be understood that various changes in the construction and arrangement of parts may be made without departing from the spirit of the invention as set forth in the appended claims.

I claim:

1. In combination, a compressor having a piston and cylinder and discharge valve mechanism therefor, an adjustable piston and cylinder type of clearance device associated with said cylinder whereby the compressor clearance is directly varied in proportion to each increment of adjustment of the clearance piston, and means whereby said clearance piston may be adjusted to different fixed positions by power impulses received directly from the compressor cylinder.

2. In combination, a compressor having a piston and cylinder and discharge valve mechanism therefor, an adjustable piston and cylinder type of clearance device associated with said cylinder whereby the compressor clearance is directly varied in proportion to each increment of adjustment of the clearance piston, means whereby said clearance piston may be adjusted to different fixed positions by power impulses received directly from the compressor cylinder, and means for controlling the expenditure of the power thereby controlling adjustment of the clearance device.

3. In combination, a compressor having a piston and cylinder and discharge valve mechanism therefor, an adjustable piston and cylinder type of clearance device associated with said cylinder whereby the compressor clearance is directly varied in proportion to each increment of adjustment of the clearance piston, and means whereby said clearance piston may be adjusted to different fixed positions by power impulses received directly from the compressor cylinder, said means including a hydraulic piston and cylinder for controlling movement of said clearance device.

4. In combination, a compressor having a cylinder, an adjustable clearance device associated therewith, and means whereby said clearance device may be adjusted by power received from the compressor, said means including a hydraulic piston and cylinder operatively connected to said clearance device so as to be movable therewith or to hold the same against movement and means whereby pressure fluid may be admitted to one end of said hydraulic cylinder for effecting a desired direction of adjustment of the clearance device.

5. In combination, a compressor having a cylinder, an adjustable clearance device associated therewith, and means whereby said clearance device may be adjusted by power received from the compressor, said means including a hydraulic piston and cylinder operatively connected to said clearance device so as to be movable therewith or to hold the same against movement and means whereby pressure fluid may be discharged from one end of said hydraulic cylinder to effect a desired degree of adjustment of the clearance device.

6. In combination, a compressor having a cylinder, an adjustable clearance device associated therewith, and means whereby said clearance device may be adjusted by power received from the compressor, said means including a hydraulic piston and cylinder operatively connected to said clearance device so as to be movable therewith or to hold the same against movement and means whereby pressure fluid may be by-passed from one end of the hydraulic cylinder to the other end thereof, thereby controlling adjustment of the clearance device.

7. In combination, a compressor having a cylinder, an adjustable clearance device associated therewith, means whereby said clearance device may be adjusted by power received from the compressor, said means including a hydraulic piston and cylinder operatively connected to said clearance device so as to be movable therewith or to hold the same against movement and means whereby pressure fluid may be by-passed from one end of the hydraulic cylinder to the other end thereof, thereby controlling adjustment of the clearance device, and means for determining whether the fluid shall be by-passed from one end of the cylinder to the other or vice versa whereby the clearance space is enlarged or reduced.

8. In combination, a reciprocating compressor piston and cylinder, an adjustable clearance device adapted to have reciprocable movement to effect a variable clearance for the compressor cylinder and to be subjected to the pressure conditions in the cylinder caused by successive compression and suction strokes of the piston, and means whereby only the compression fluctuation may be utilized to effect movement of the clearance device.

9. In combination, a reciprocating compressor piston and cylinder, an adjustable clearance device adapted to have reciprocable movement to effect a variable clearance for the compressor cylinder and to be subjected to the pressure conditions in the cylinder caused by successive compression and suction strokes of the piston, and means whereby only the suction fluctuation may be utilized to effect movement of the clearance device.

10. In combination, a compressor cylinder and a reciprocating piston therein, an adjustable reciprocable clearance device adapted to be subjected to the pressure fluctuations in the cylinder caused by successive compression and suction strokes of the piston, a hydraulic cylinder and piston connected to said clearance device, and means for controlling the flow of fluid to or from each end of the hydraulic cylinder whereby either the compression or suction strokes may be utilized to effect movement of the clearance device.

11. In combination, a compressor cylinder and a reciprocating piston therein, an adjustable reciprocable clearance device adapted to be subjected to the pressure fluctuations in the cylinder caused by successive compression and suction strokes of the piston, a hydraulic cylinder and piston connected to said clearance device, passage forming means for allowing communication between opposite ends of said hydraulic cylinder, check valve mechanisms associated therewith for permitting fluid flow from one end of the hydraulic cylinder to the other or vice versa, and valve mechanism for selecting the direction of flow between the ends of the hydraulic cylinder.

12. In combination, a compressor cylinder and a reciprocating piston therein, an adjustable reciprocable clearance device adapted to be subjected to the pressure fluctuations in the cylinder caused by successive compression and suction strokes of the piston, a hydraulic cylinder and piston connected to said clearance device, passages between the opposite ends of the hydraulic cylinder, a plurality of oppositely acting check valves associated with said passages, and pilot valve mechanism associated with said passages adapted to permit fluid flow from one end of the hydraulic cylinder past one of said check valves to the other end of the hydraulic cylinder, both of said check valves being rendered inoperative when the pilot valve mechanism is moved to neutral position, thereby holding the clearance device against movement.

13. In combination, a compressor cylinder and a reciprocating piston therein, an adjustable reciprocable clearance device adapted to be subjected to the pressure fluctuations in the cylinder caused by successive compression and suction strokes of the piston, a hydraulic cylinder and piston connected to said clearance device, passages between the opposite ends of the hydraulic cylinder, a plurality of oppositely acting check valves associated with said passages, pilot valve mechanism associated with said passages adapted to permit fluid flow from one end of the hydraulic cylinder past one of said check valves to the other end of the hydraulic cylinder, both of said check valves being rendered inoperative when the pilot valve mechanism is moved to neutral position, thereby holding the clearance device against movement, and means for automatically controlling said pilot valve in accordance with predetermined conditions of operation in response to which it is desired to have the clearance adjusted to vary the capacity of the compressor.

14. In combination, a compressor cylinder having a reciprocating piston therein, an adjustable clearance device having a movable wall bounding the clearance volume of said cylinder, means for controlling adjustment thereof, and restoring mechanism associated with said controlling means and actuated by movement of said wall whereby said controlling means upon being actuated from a normally neutral position is restored thereto by movement of said wall.

15. In combination, a compressor cylinder having a reciprocating piston therein, an adjustable clearance device associated with said cylinder, a hydraulic piston and cylinder directly connected to said device, means for controlling flow of fluid relative to each end of said hydraulic cylinder whereby adjustment of the clearance device is effected, a valve mechanism for controlling said fluid flow, and restoring mechanism between said valve mechanism and said hydraulic piston whereby upon relatively quick adjustment of the clearance device the valve mechanism automatically retards said fluid flow so as to insure stability of adjustment.

16. In combination, a compressor cylinder having a reciprocating piston therein, an adjustable clearance device associated with said cylinder, a hydraulic piston and cylinder directly connected to said device, means for controlling flow of fluid relative to each end of said hydraulic cylinder whereby adjustment of the clearance device is effected, a valve mechanism for controlling said fluid flow, restoring mechanism between said valve mechanism and said hydraulic piston whereby upon relatively quick adjustment of the clearance device the valve mechanism automatically retards said fluid flow so as to insure stability of adjustment, and condition responsive means associated with said restoring and valve mechanisms.

17. In combination, a compressor cylinder having a reciprocating piston therein, an adjustable clearance device associated with said cylinder, a hydraulic piston and cylinder directly connected to said device, means for controlling flow of fluid relative to each end of said hydraulic cylinder whereby adjustment of the clearance device is effected, a valve mechanism for controlling said fluid flow, restoring mechanism between said valve mechanism and said hydraulic piston whereby upon relatively quick adjustment of the clearance device the valve mechanism automatically retards said fluid flow so as to insure stability of adjustment, and condition responsive means associated with said restoring and valve mechanisms, and means for manually controlling said valve mechanism in addition to the control by the condition responsive means.

LEWIS FERRY MOODY.